April 14, 1970     M. C. HORNUNG ET AL     3,505,704
HINGE FOR TRANSVERSE RELATIVE MOVEMENT FOR FRAME STRUCTURES
Filed Sept. 20, 1967
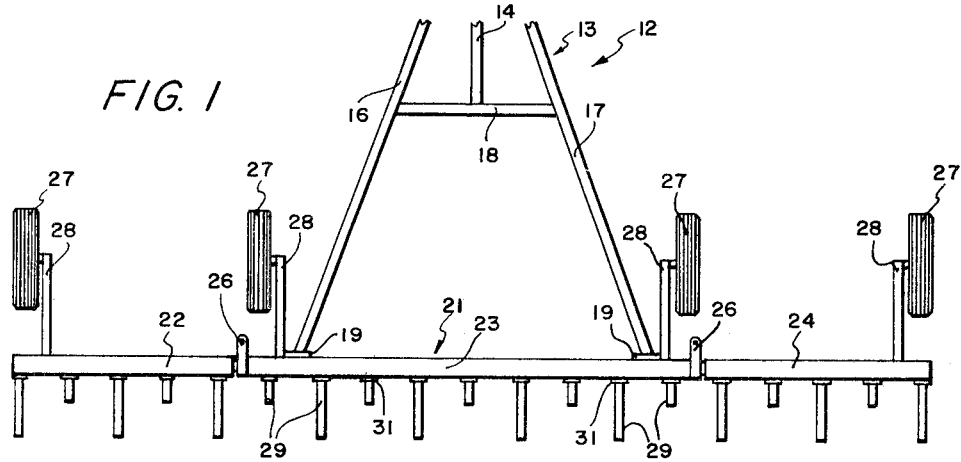
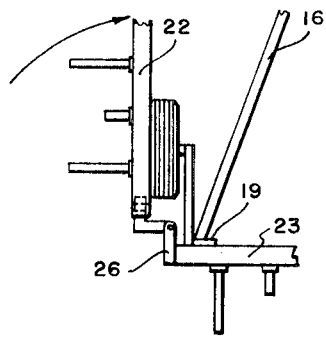
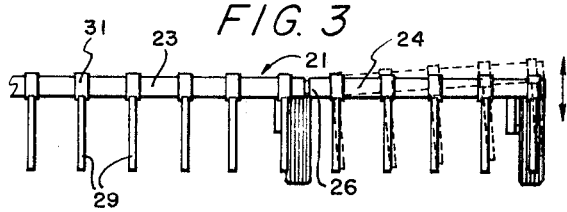
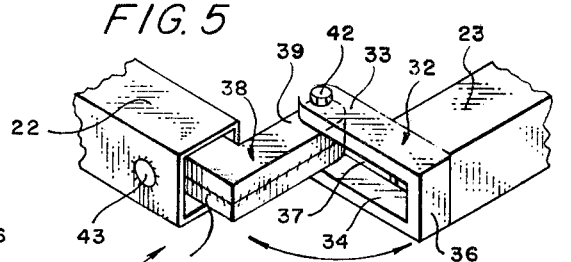
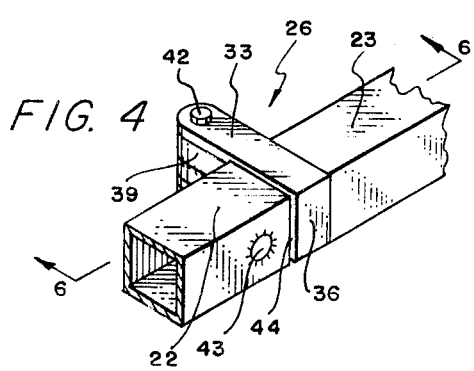
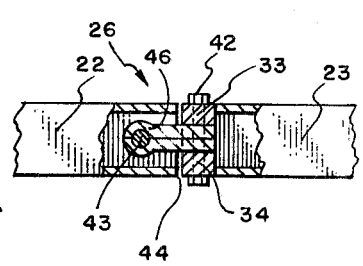
INVENTOR
MICHAEL C. HORNUNG
EVERETT J. TASSET
BY
ATTORNEYS United States Patent Office 3,505,704
Patented Apr. 14, 1970

3,505,704
HINGE FOR TRANSVERSE RELATIVE MOVEMENT FOR FRAME STRUCTURES
Michael C. Hornung and Everett J. Tasset, both of
Spearville, Kans. 67876
Filed Sept. 20, 1967, Ser. No. 669,185
Int. Cl. E05d *3/10*
U.S. Cl. 16—128                                    4 Claims

ABSTRACT OF THE DISCLOSURE

A hinge for uniting sections of a frame of agricultural implements thereby allowing the frame to be folded in a forward position, when desired, and when in an extended working position allowing the elements to rise and fall with variations of the surface of the ground. The hinge maintains the sections in a horizontal position when in both the folded and extended working position.

---

This invention relates to frames, especially earth working implements normally used in conjunction with farm tractors. In one aspect it relates to a hinge element for uniting frame sections, particularly sections of a farm implement. In another aspect it relates to a hinge for transverse relative movement for frame structures of agricultural implements. In another aspect it relates to a hinge which maintains the frame structure and thus the implement carried thereon in a horizontal position when the frame is both in the folded and extended working position.

Farm implements are known in the prior arts which operate to cultivate or break up the earth's surface. Because of the need to work the surface in a minimum period of time it is desirable to join a number of ground working implements together in order to work a large swath of ground in a single pass. However, in so doing, the joined implements have created problems when moving the implements from one field to another and through gates and the like. Hinges of the prior art are structurally complicated, requiring specially designed connecting means, and therefore, are of a rather expensive construction. Further, hinges of the prior art suffer from the disadvantages in that they are not designed to compensate for the uneven surface of the ground due to the necessary rigidness required for ground working operations without auxiliary attachment and thus the depth at which the ground is worked is usually uneven, and further, when the prior art devices are in a folded position the frame sections are not maintained horizontal. This has created serious problems where an implement such as a grain drill has been mounted on the frame structure in that when the frame structure is folded the grain must be emptied or else the grain will be caused to spill.

According to the present invention a hinge for uniting sections of agricultural implements is provided which is relatively simple in structure, sturdy in construction, economical to manufacture and assemble and which provides transverse relative movement of the sections of the ground working implement thereby providing an even depth at which the ground is worked as well as allowing the sections to be forwardly folded for transportation from one field to another and through gates and the like, and, at the same time, maintaining the frame structure in a horizontal position when folded.

In accordance with preferred embodiments of the present invention, a new hinge for transverse relative movement for frame structures of agricultural implements is provided which includes a first frame having in one end portion a mount in a substantially transversely extending position with respect to the longitudinal axis of the first frame. One leg member of a generally L-shaped body having two leg members is pivotably connected to the mount by a first connector and the other leg member is pivotally connected to one end of a second frame by a second connector. The two leg members of the L-shaped body are connected so that their pivoting axes are positioned perpendicular to each other, thereby allowing the sections of the implement to rise and fall in a relative manner due to variations in the contour of the surface being worked and, at the same time allowing the sections to be positioned in a forward direction so that the end sections are moved from a substantially aligned position with the center section to a substantially right angle therewith the end sections remain in a horizontal position thus facilitating movement of the implement from one location to another. The mount, L-shaped body, second frame and the two connectors are constructed, mounted and positioned together in a manner so that when the sections are in an aligned position a gap is formed between the adjacent end positioned frames and the mount thereby allowing up and down relative movement of the end sections of the implement.

An object of this invention is to provide a new hinge for uniting agricultural implements.

Another object of this invention is to provide a new hinge for uniting sections of agricultural implements that provides for transverse relative movement for frame structures of the agricultural implement.

Another object of this invention is to provide a hinge which is inexpensive and does not suffer from the disadvantages of requiring specially designed expensive connecting means, as well as being structurally complicated.

Another object of this invention is to provide a hinge element which remains rigid when the ground working elements are working the ground without need for auxiliary equipment to maintain the structure in a stable position.

Another object of this invention is to provide a hinge for uniting sections of agricultural implements that maintains the end sections of the implement in a horizontal position when the same are folded in a forward direction.

Various other objects, advantages, and features of the invention will become apparent to those skilled in the art from a reading of the written description, the drawings, and the appended claims.

In the drawings:

FIG. 1 is a fragmentary top plan view of the hinge element for agricultural implements of this invention.

FIG. 2 is a fragmentary top plan view depicting the transverse movement of the hinge element.

FIG. 3 is a fragmentary rear plan view depicting the relative movement provided by the hinge element.

FIG. 4 is a fragmentary enlarged perspective view of the hinge of the invention showing the attachment of two sections of another agricultural implement thereto.

FIG. 5 is a fragmentary enlarged perspective view of the hinge of FIG. 4 in a transverse position.

FIG. 6 is a fragmentary enlarged partial cross sectional view of the hinge of FIG. 4.

The following is a discussion and description of preferred specific embodiments of the hinge for transverse relative movement for frame structures of agricultural implements according to this invention, such being made with reference to the drawings whereupon the same reference numerals are used to indicate the same or similar parts and/or structures. It is to be understood that such is for illustrative purposes only and such discussion and description is not to unduly limit the scope of the invention.

Referring now to the drawings in detail, and particularly to FIG. 1, there is shown a harrow type farm implement 12 connected to a conventional farm tractor or the like.

Farm implement 12 has a generally horizontally, disposed A-shaped frame means 13 having a tongue member 14 which is adapted to be connected to a tractor and the like by means not shown. A-shaped frame means 13 comprises a pair of forwardly converging elongated members, 16 and 17, secured to tongue member 14 and interconnected rearwardly thereform by cross member 18, also connected to tongue member 14. The rearwardmost ends of elongated member 16 and 17 are connected to support brackets 19 secured to a horizontally disposed transversely extended support beam 21. Support beam 21 comprises three frame means 22, 23 and 24, which are joined together by two hinge means 26 as can readily be seen in FIG. 1. Frame means 22, 23 and 24 are formed of a square shaped or rectangular tubing material. A-frame means 13 is held in an elevated position by a plurality of spaced wheel means 27 secured to forwardly extended support bars 28, respectively connected to support beam 21. Wheel means 27 are secured to support bars 28 by any suitable means (not shown) such as a connecting or lug means providing for movement of wheel means 27 relative to A-frame means 13 so as to selectively adjust the height of the same relative to the supporting ground surface. A plurality of ground working means 29 are mounted on the transversely extended support beam 21 in a spaced relationship providing for working engagement with the supporting ground by any suitable means such as clamp members 31.

Referring now to FIG. 2, frame means 22 and 23 of support beam 21 are shown connected to hinge means 26. Frame means 22 is depicted in a forwardly extended position with respect to frame means 23. Frame means 23 is connected to forwardly converging elongated members 16 and 17 by support bracket 19 which in turn is connected to tongue member 14 for attachment to a tractor. As can readily be seen, when support beam 21 is in a forwardly extending folded position by frame means 22 being positioned as shown in FIG. 2, the harrow type frame implement 12 can readily be moved through gates and other restricted areas from one field to another, and the sections of support beam 21 are maintained in a horizontal position.

In FIG. 3, frame means 23 and 24 of support beam 21 are shown positioned in a substantially aligned position through hinge means 26 and in actual working position when the implement is being employed to work the ground. A plurality of ground working means 29 are mounted on frame means 23 and 24 in a spaced relationship provided for working engagement with the support ground by clamp members 31. Hinge means 26 is constructed, as will hereinafter be more fully described, so as to allow frame means 24 and thus ground working means 29 to fluctuate in an up and down manner as the contour of the ground being worked changes, thereby insuring the same depth of ground being worked regardless of slight variations in the contour of the soil.

Referring now to FIGS. 3 through 6, hinge means 26 of this invention will be more fully described. Hinge means 26 is provided with angle member 32 as can be seen in FIG. 5. Yoke member 32 is a U-shaped member having two parallel leg members 33 and 34 maintained in a spaced relationship with each other by base member 36 connected to one end of each of said leg members 33 and 34. Each leg member 33 and 34 is provided with axially aligned openings at their end portions furtherest removed from base member 36. A first frame means 23, such as a square shaped tubular frame element, is connected to U-shaped yoke member 32 so that the base member 36 and a portion of leg members 33 and 34 of yoke member 32 abut one end of first frame means 23. First frame means 23 and yoke member 32 are connected thereby positioning opening 37 in yoke member 32 in unrestricted, transversely extended position with respect to the longitudinal axis of the first frame means 23. A second frame means 22, such as a square shaped tubular frame element, is provided with axially aligned openings which are positioned in a plane perpendicular to the axially aligned openings within leg members 33 and 34 of yoke member 32. A generally L-shaped body means 38 having a first leg member 39 and a second leg member 41 positioned at about a 90 degree angle with respect to each other and having an opening in the end portion of leg members 39 and 41, but in a perpendicular plane with each other, is pivotally connected to and maintained within opening 37 formed by parallel leg members 33 and 34 of yoke member 32. A first connecting means, such as pin element 42 is employed to maintain first leg member 39 of said L-shaped body means 38 within opening 37 of yoke member 32. A second connecting means, such as pin 43 is employed to pivotally connected second leg member 41 of L-shaped body means 28 to second frame means 22 by positioning pin 43 within the axially aligned openings of second frame means 22 and second leg member 41 of L-shaped body means 38.

Referring now to FIGS. 4 and 6, hinge means 26 connected to two frame sections, such as first and second frame means 23 and 22, is shown. A gap 44 is shown formed by positioning second leg member 41 of L-shaped body means 38 in second frame means 22 in such a manner so that when first and second frame means 23 and 22 are in a substantially aligned position, and thus hinge means 26 is in a closed position, second frame means 22 does not abut hinge means 26 but a gap of about ¼" is formed therebetween thereby providing for the relative up and down movement of the end sections of support beam 21 and thus ground working means 29 in response to changes in the contour of the earth.

Referring now to FIG. 6, L-shaped body means 38 is shown wherein said leg member 41 is provided with a sleeve 46 on the end thereof for receiving pin element 43 thereby pivotally maintaining leg member 41 within the frame means 22. Desirable results have been obtained in employing hinge means 26 to couple frame means 22, 23 and 24 together wherein frame means 22, 23 and 24 are square shaped tubular member having an I.D. of 4" and L-shaped body means 38 has a 2" I.D. and sleeve 46 of second leg member 41 has an O.D. of 3" and an I.D. of 1½". Due to the stress and strain placed on pin elements 42 and 43 it has been found desirable that relatively large pin elements be used, such as a pin element having a 1½ inch diameter and a length of about 4 inches. Likewise gap 44 between hinge means 26 and the adjoining frame means such as frame means 22, is necessary to provide the up and down movement hereinbefore described.

The foregoing discussion and description has been made in connection with preferred specific embodiments of the hinge for transverse relative movement for frame structures of agricultural implements of the invention. However, it is to be understood that the discussion and description is only intended to illustrate and teach those skilled in the art how to practice the invention.

We claim:
1. Hinge means comprising:
 (a) a first frame means having at one end portion mounting means in a substantially transversely extending position with respect to the longitudinal axis of said first frame means;
 (b) a second frame means;
 (c) a generally L-shaped body means having a first and second leg member;
 (d) first connecting means pivotally connecting in an end portion said first leg member of said body means to one end portion of said mounting means to provide for transverse relative movement between said first and second frame means from a substantially aligned position to a forward substantially right angle; second connecting means pivotally connecting an end portion of said second leg member to one end of said second frame means; said mounting means, said L-shaped body means, said second frame means, and said first and second connecting means being constructed, mounted and positioned to provide for a gap between said second frame means and said mounting means when said first leg member of said L-shaped body means is in a retracted position substantially within said mounting means and said first and second frame means are in aligned position, and said second frame means in all positions is movable relative said second leg member of said body means, and (e) said second frame means engageable with said mounting means to limit its pivotal movement in a rearward direction for proper working conditions, and said second frame means being free to pivot 90° in the opposite direction.

2. A hinge means as described in claim 1, wherein:
(a) said second connecting means positioned within said second frame means, and said second leg member engagable with upper and lower adjacent portions of said second frame means to permit but limit vertical flexibility of said second frame means.

3. A hinge means as described in claim 1, wherein:
(a) said mounting means comprises a yoke member having two parallel leg members maintained in a spaced relationship with each other by a base member connected to one end of each of said parallel leg members, said parallel leg members being provided with axially aligned openings at their end portion furtherest removed from said base member, and said first leg member of said L-shaped body means is provided with an opening therethrough at its end portion which is axially aligned with the opening in said parallel leg members of said yoke member, said yoke and first leg openings having first pin means received therein, (b) said second leg member of said L-shaped body means is provided with an opening therethrough at its end portion in a perpendicular position with respect to the opening in said first leg member of said L-shaped body means, and said second frame means is provided with axially aligned openings at one end portion which communicate with the opening in said second leg member of said L-shaped body means, said second leg and second frame openings having second pin means received therein, and (c) said parallel leg members receiving said first leg member entirely therebetween in the working condition permitting limited flexing movement of said second frame means.

4. A hinge means as described in claim 1, wherein:
(a) said mounting means including a yoke member having two parallel leg members maintained in a spaced relationship with each other by a base member connected to one end of each of said leg members, said leg members being provided with axially aligned openings at their end portion furthermost removed from said base member;

(b) said first frame means including a first square shaped tubular frame element connected to said yoke member so that said base member and a portion of said leg members nearest thereto abut one end of said first square shaped tubular frame element and the remaining portion of said leg members transversely extend from said first square shaped tubular frame element;

(c) said second frame means including a second square shaped tubular frame element having axiallly aligned openings being positioned perpendicular to the axially aligned openings within said two parallel leg members of said yoke member;

(d) said first and second leg members positioned at about a 90 degree angle with respect to each other, said second leg member of said L-shaped body means being provided with a sleeve on its end portion and said first leg member having an opening through at its end portion and perpendicular to the opening in said sleeve;

(e) said first connecting means having a first pin element positioned within the axially aligned opening in said parallel members of said yoke member and said first leg member of said L-shaped body means thereby pivotally connecting said first leg member of said L-shaped body means within said yoke member; and (f) said second connecting means having a second pin element positioned within said sleeve of said second leg member thereby pivotally connecting said second leg member of said L-shaped body means within said second frame element.

References Cited
UNITED STATES PATENTS

| | | | |
|---|---|---|---|
| 2,978,042 | 4/1961 | Jones | 172—456 X |
| 3,255,830 | 6/1966 | Groenke | 172—456 |
| 3,376,052 | 4/1968 | Lohrman | 172—311 X |

WILBUR L. McBAY, Primary Examiner

S. C. PELLIGRINO, Assistant Examiner

U.S. Cl. X.R.

172—311